US010626976B2

(12) United States Patent
Mori et al.

(10) Patent No.: US 10,626,976 B2
(45) Date of Patent: Apr. 21, 2020

(54) SCISSOR GEAR OIL SUPPLYING STRUCTURE

(71) Applicant: ISUZU MOTORS LIMITED, Shinagawa-ku, Tokyo (JP)

(72) Inventors: Hiroaki Mori, Ayase (JP); Kazuhiro Hirose, Yokohama (JP); Tsutomu Asakura, Atsugi (JP); Naoki Mizukami, Atsugi (JP)

(73) Assignee: ISUZU MOTORS LIMITED, Tokyo (JP)

( * ) Notice: Subject to any disclaimer, the term of this patent is extended or adjusted under 35 U.S.C. 154(b) by 208 days.

(21) Appl. No.: 15/775,316

(22) PCT Filed: Nov. 11, 2016

(86) PCT No.: PCT/JP2016/083544
§ 371 (c)(1),
(2) Date: May 10, 2018

(87) PCT Pub. No.: WO2017/082394
PCT Pub. Date: May 18, 2017

(65) Prior Publication Data
US 2018/0328478 A1 Nov. 15, 2018

(30) Foreign Application Priority Data
Nov. 12, 2015 (JP) .................................. 2015-222129

(51) Int. Cl.
*F16H 55/18* (2006.01)
*F16H 57/04* (2010.01)
(52) U.S. Cl.
CPC ........... *F16H 55/18* (2013.01); *F16H 57/043* (2013.01); *F16H 57/0495* (2013.01)

(58) Field of Classification Search
CPC .... F16H 55/18; F16H 57/043; F16H 57/0495; F16H 57/0493
(Continued)

(56) References Cited

U.S. PATENT DOCUMENTS

| 1,629,564 A | * | 5/1927 | White | F16H 57/12 |
| | | | | 74/440 |
| 2,741,276 A | * | 4/1956 | Warren | F02B 63/02 |
| | | | | 30/123.4 |

(Continued)

FOREIGN PATENT DOCUMENTS

| DE | 363770 C | * 11/1922 | ......... F16H 57/0427 |
| DE | 1625032 A1 | 6/1970 | |

(Continued)

OTHER PUBLICATIONS

International Search Report and Written Opinion for related PCT application No. PCT/JP2016/083544, dated Jan. 24, 2017; English translation of ISR provided; 8 pages.

(Continued)

*Primary Examiner* — Jake Cook
*Assistant Examiner* — T. Scott Fix
(74) *Attorney, Agent, or Firm* — Procopio, Cory, Hargreaves & Savitch LLP

(57) ABSTRACT

A scissor gear oil supplying structure includes: a scissor gear that is provided on an outer the circumference of a tip end portion of a shaft; a first oil passage; a second oil passage that extends from the first oil passage in the radial direction; an extension hole that is opened at the front end surface of the shaft; a female screw that is formed in the first oil passage on the rear side of the second oil passage; a rotating member; and a bolt that is inserted into the extension hole and the first oil passage to fasten the rotating member to the shaft and is screwed into the female screw, in which lubri- (Continued)

cating oil is guided from the first oil passage to the second oil passage along a gap between thread grooves of the female screw and thread ridges of the bolt.

4 Claims, 3 Drawing Sheets

(58) Field of Classification Search
USPC ...... 74/409, 440; 184/38.2, 61, 63, 26, 27.1, 184/31, 38.4, 37, 70, 109
See application file for complete search history.

(56) References Cited

U.S. PATENT DOCUMENTS

| | | | | |
|---|---|---|---|---|
| 4,696,201 | A * | 9/1987 | Hattori | F01L 1/02 184/6.12 |
| 2004/0200302 | A1 * | 10/2004 | Kampichler | F16H 55/18 74/409 |
| 2007/0175706 | A1 * | 8/2007 | Shilo | F16H 57/0427 184/6.12 |
| 2009/0146650 | A1 * | 6/2009 | Hatanaka | G01D 5/04 324/207.25 |
| 2011/0030489 | A1 * | 2/2011 | Chen | F16H 55/18 74/409 |
| 2013/0228029 | A1 * | 9/2013 | Murphy | F16H 55/18 74/443 |

FOREIGN PATENT DOCUMENTS

| | | |
|---|---|---|
| EP | 1026371 A1 | 8/2000 |
| JP | S55-055656 U1 | 4/1980 |
| JP | S61-125617 U | 8/1986 |
| JP | H02-072330 U1 | 6/1990 |
| JP | H09-089083 A | 3/1997 |
| JP | 2002-195387 A | 7/2002 |
| JP | 2005-36835 A | 2/2005 |

OTHER PUBLICATIONS

Extended European Search Report for European Application No. 16864355.9, dated Jun. 4, 2019, 9 pages.

* cited by examiner

SCISSOR GEAR OIL SUPPLYING STRUCTURE

CROSS-REFERENCE TO RELATED APPLICATIONS

This application is a U.S. National Stage entry of PCT Application No: PCT/JP2016/083544 filed Nov. 11, 2016, which claims priority to Japanese Patent Application No. 2015-222129, filed Nov. 12, 2015, the contents of which are incorporated herein by reference.

TECHNICAL FIELD

This disclosure relates to a scissor gear oil supplying structure for supplying lubricating oil to a scissor gear.

BACKGROUND ART

A scissor gear is formed by superposing a main gear and a sub gear in an axial direction and forming a spring chamber between these gears, and providing a spring for biasing the gears in a circumferential direction in the spring chamber.

The contact of the spring and the gear is rubbed. Therefore, it is necessary to supply lubricating oil to the spring chamber.

CITATION LIST

Patent Literature

[Patent Literature 1]: Japanese Unexamined Patent Application Publication No. 2005-36835

SUMMARY

Technical Problem

However, as ways for supplying lubricating oil to a scissor gear provided on the outer circumference of a tip end portion of a shaft, it is considered to form an oil passage for supplying lubricating oil in a shaft. However, in a case where a rotating member such as a rotor is fastened to the tip end of a shaft, it is difficult to secure a lubrication passage connected to a scissor gear in the shaft.

This disclosure provides a scissor gear oil supplying structure capable of securing a lubrication passage connected to a scissor gear in a shaft even in a case where a rotating member is fastened to a tip end of the shaft.

Solution to Problem

A scissor gear oil supplying structure of this disclosure includes: a scissor gear that is provided on an outer circumference of a tip end portion of a shaft extending from an inside of an engine main body; a first oil passage that is formed on a central axis of the shaft and extends toward the front in the shaft in an extending direction from the inside of the engine main body; a second oil passage that is formed and extends from the first oil passage in a radial direction and communicates with the scissor gear; an extension hole that is formed to extend toward the front from the first oil passage on the shaft and is opened at a front end surface of the shaft; a female screw that is formed in the first oil passage on a rear side of the second oil passage; a rotating member that is arranged on the shaft on a front side of the scissor gear; and a bolt that is inserted into the extension hole and the first oil passage to fasten the rotating member to the shaft and is screwed into the female screw, in which lubricating oil from the engine main body is guided from the first oil passage to the second oil passage along a gap between thread grooves of the female screw and thread ridges of the bolt.

Advantageous Effects

According to the scissor gear oil supplying structure of this disclosure, it is possible to secure a lubrication passage connected to a scissor gear in a shaft even in a case where a rotating member is fastened to a tip end of the shaft.

DESCRIPTION OF EMBODIMENTS

Hereinafter, a suitable embodiment of this disclosure will be described with reference to the accompanying drawings.

Figure 1:
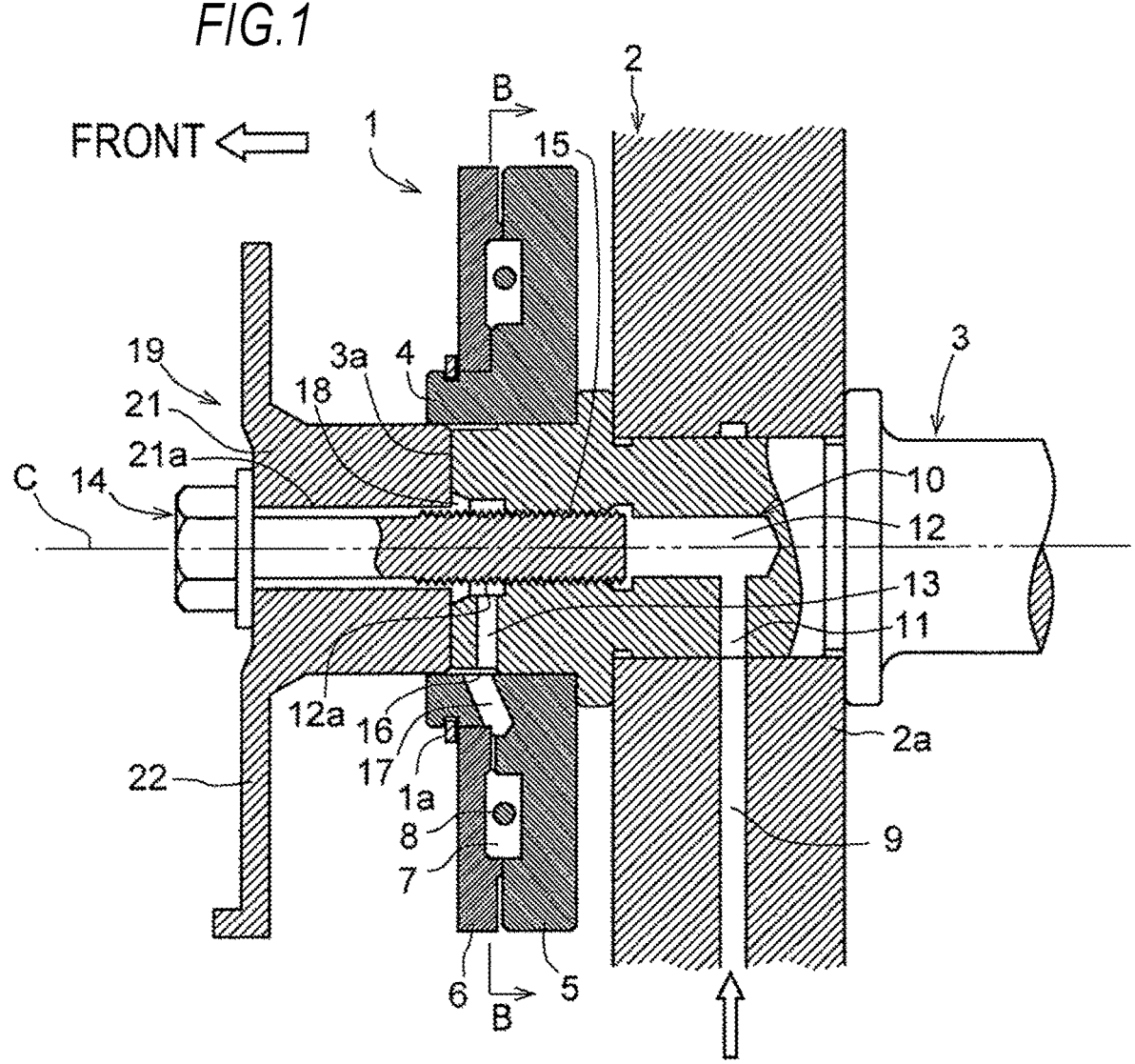
FIG. 1 is a cross-sectional view illustrating a scissor gear according to an embodiment of this disclosure.
Figure 2:
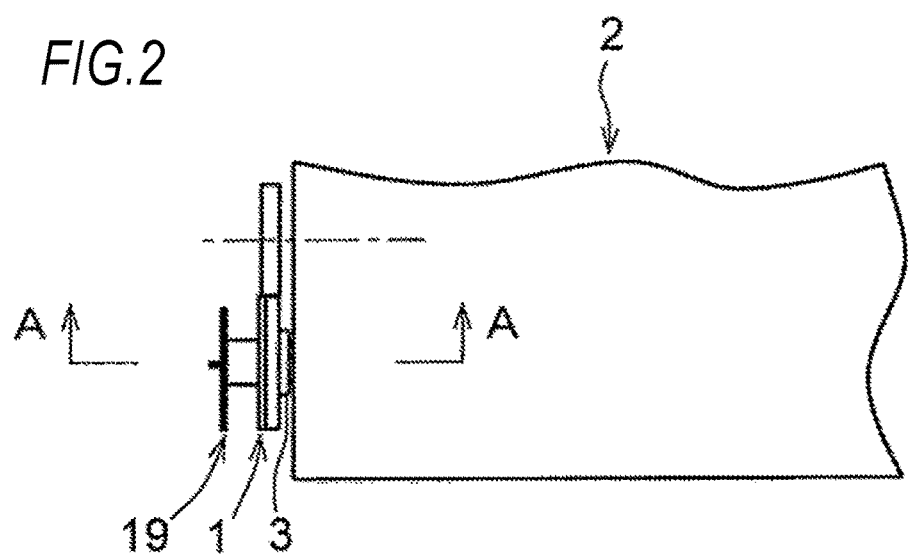
FIG. 2 is a plan view illustrating the main part of an engine in which the scissor gear is used.

FIG. 2 is a plan view illustrating the main part of an engine and FIG. 1 is a cross-sectional view of FIG. 2 taken along line A-A. In the embodiment, for the sake of convenience, the extending direction of a shaft 3 (refer to FIG. 1) is the front and the opposite direction is the rear.

As illustrated in FIGS. 1 and 2, a scissor gear 1 is provided on the outer circumference of a tip end portion of the shaft 3, such as a cam shaft, which extends from the inside of an engine main body 2 such as a diesel engine. The engine main body in the embodiment is engine structure components such as a cylinder head, a cylinder block, or a crankcase.

Figure 4:
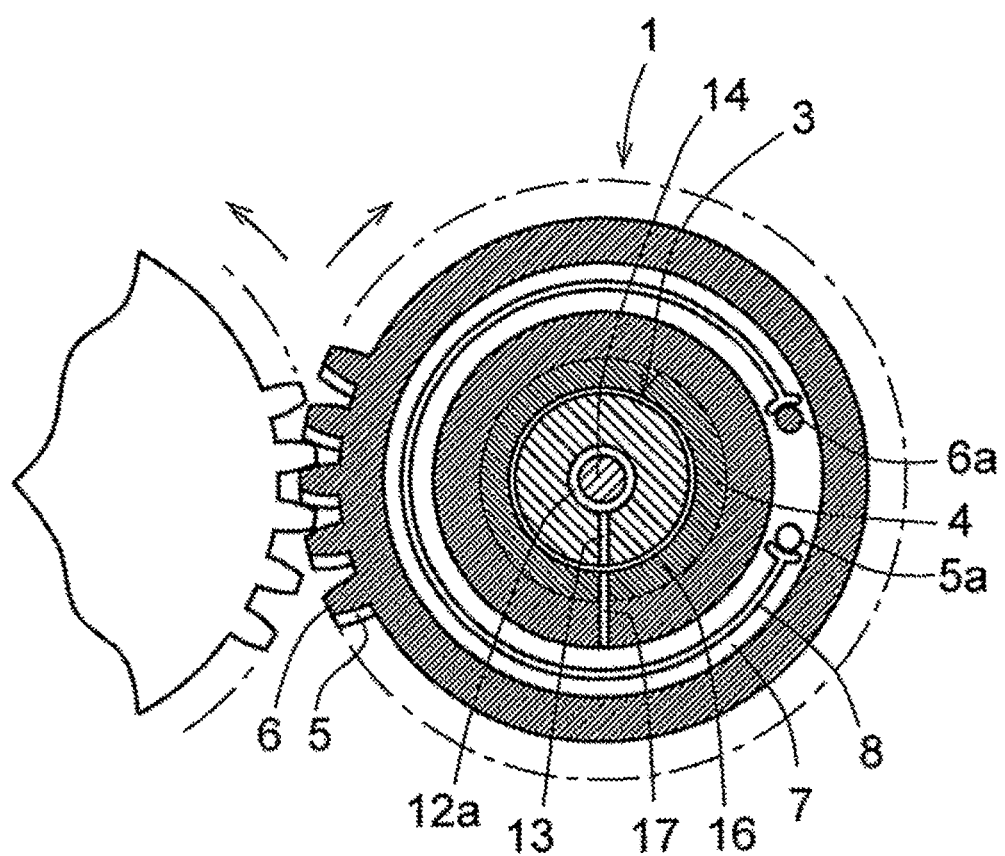
FIG. 4 is a cross-sectional view of FIG. 1 taken along line B-B.

As illustrated in FIGS. 1 and 4, the scissor gear 1 includes a main gear 5 that has a boss portion 4 and is attached to the outer circumference of the shaft 3, a subgear 6 that is rotatably provided on the main gear 5 while being coaxially superposed thereon, a snap ring 1a that is provided on the main gear 5 and regulates the movement of the subgear 6 in the axial direction, and a snap ring 8 that is accommodated in a spring chamber 7 formed between the main gear 5 and the subgear 6 and biases the subgear 6 toward the main gear 5 in the rotation direction.

The spring chamber 7 is formed coaxially with the main gear 5 in an annular shape. The snap ring 8 is formed in a substantially C shape such that both ends thereof are brought into pressure contact with pins 5a and 6a respectively formed in the main gear 5 and the subgear 6. The boss portion 4 of the scissor gear 1 is formed to extend toward the front from the shaft 3.

In the engine main body 2, a pump (not shown) for feeding lubricating oil such as engine oil by pressure is provided and an oil gallery 9 for circulating the lubricating oil from the pump to each place is formed.

The shaft 3 is rotatably supported on a bearing portion 2a formed in the front end portion of the engine main body 2. In the bearing portion 2a, the oil gallery 9 is formed.

In the shaft 3, a supply oil passage 10 for supplying the lubricating oil from the oil gallery 9 to the scissor gear 1 is formed.

The supply oil passage 10 includes a communication oil passage 11 that is connected to the oil gallery 9 and is formed to extend from the outer circumferential surface of the shaft 3 to the inside in the radial direction, a first oil passage 12 that is connected to the communication oil passage 11 and is formed on a central axis C of the shaft 3 to extend from the inside of the engine main body 2 in the extending direction of the shaft 3, and a second oil passage 13 that is formed to extend from the first oil passage 12 in the radial direction and communicates with the scissor gear 1.

The first oil passage 12 is linearly formed. In the first oil passage 12, an enlarged diameter portion 12a for causing the contact position with the second oil passage 13 to be separated from a bolt 14 described later to the outside in the radial direction is formed. In the first oil passage 12 on the rear side of the second oil passage 13, a female screw 15 for screwing the bolt 14 described later is formed.

The second oil passage 13 is formed to have a smaller diameter than the first oil passage 12.

An oil reservoir portion 16 that stores the lubricating oil from the second oil passage 13 is formed between the shaft 3 and the scissor gear 1. The oil reservoir portion 16 is formed by partially reducing the diameter of the outer circumferential surface of the shaft 3. An introduction oil passage 17 of the scissor gear 1 is connected to the oil reservoir portion 16. The introduction oil passage 17 is provided for introducing lubricating oil from the oil reservoir portion 16 to the spring chamber 7 and is formed in the scissor gear 1 to extend in the radial direction.

On the shaft 3, an extension hole 18 that coaxially extends toward the front from the first oil passage 12 is formed. The extension hole 18 is opened at a front end surface 3a of the shaft 3. The bolt 14 for fastening the rotating member 19 such as a rotor to the shaft 3 is inserted into the extension hole 18.

The bolt 14 is inserted into the extension hole 18 and the first oil passage 12 from the front and is screwed and fastened to the female screw 15 of the first oil passage 12.

Figure 3:
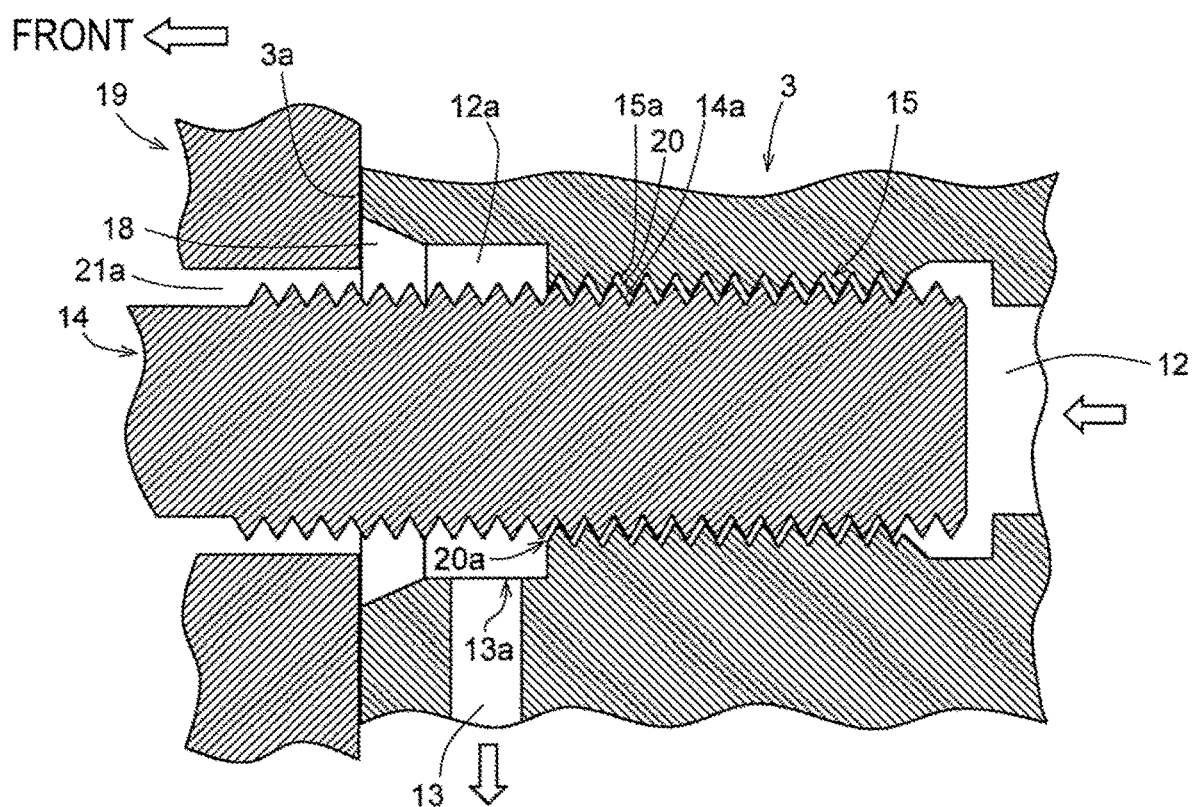
FIG. 3 is an enlarged view illustrating the main part of FIG. 1.

As illustrated in FIG. 3, when the bolt 14 is fastened to the female screw 15, a helical gap 20 is formed between thread ridges 14a of the bolt 14 and thread grooves 15a of the female screw 15. The gap 20 communicates with the first oil passage 12 and forms a flow passage connecting the first oil passage 12 and the second oil passage 13.

As illustrated in FIG. 1, the rotating member 19 includes a main body portion 21 which is formed to have the same diameter as that of the shaft 3 and having a rear end portion inserted into the boss portion 4 of the scissor gear 1, and a disc portion 22 that extends from the front end of the main body portion 21 to the outside in the radial direction. The main body portion 21 has a bolt hole 21a penetrating the main body portion along the central axis C. The bolt 14 is inserted into the bolt hole 21a. The bolt 14 is inserted into the first oil passage 12 through the bold hole 21a and the extension hole 18 and screwed and fastened to the female screw 15 of the first oil passage 12 to fasten the rotating member 19 to the shaft 3.

The rotating member 19 of the embodiment is formed of a sensor ring used for detection of the rotation speed of the shaft 3. In the sensor ring, rotation sensors (not shown) are arranged to face each other. However, the rotating member 19 is not limited to the sensor ring and other members may be used.

Next, the action of the embodiment will be described.

The lubricating oil fed to the first oil passage 12 from the oil gallery 9 of the engine main body 2 through the communication oil passage 11 of the shaft 3 flows along the helical gap 20 formed between the thread grooves 15a of the female screw 15 and the thread ridges 14a of the bolt 14.

As illustrated in FIG. 3, the gap 20 is formed on the rear side of the thread ridges 14a by bringing the thread ridges 14a of the bolt 14 into press contact with the rear surfaces of the thread grooves 15a when the bolt 14 is fastened to the shaft 3. The gap 20 is formed between the thread ridges 14a and the thread grooves 15a and is formed in a helical shape along the thread grooves 15a. Thus, lubricating oil flows along the gap 20 to the enlarged diameter portion 12a and is guided to the second oil passage 13. When the lubricating oil passes through the gap 20, the flow rate of lubricating oil is reduced and adjusted to be appropriate. That is, the gap 20 functions as an orifice and a reduction in oil pressure of the oil gallery 9 is controlled.

As illustrated in FIGS. 1 and 4, the lubricating oil reaching the second oil passage 13 reaches the introduction oil passage 17 of the scissor gear 1 through the oil reservoir portion 16 and is supplied to the spring chamber 7.

In this manner, since the first oil passage 12 that is formed on the central axis C of the shaft 3 to extend toward the front from the inside of the engine main body 2, the second oil passage 13 that extends from the first oil passage 12 in the radial direction and communicates with the scissor gear 1, the extension hole 18 that is formed to extend toward the front from the first oil passage 12 and is opened at the front end surface 3a of the shaft 3, the female screw 15 that is formed in the first oil passage 12 on the rear side of the second oil passage 13, the rotating member 19 that is arranged on the shaft 3 on the front side of the scissor gear 1, the bolt 14 that is inserted into the first oil passage 12 from the opening of the extension hole 18 to fasten the rotating member 19 to the shaft 3 and is screwed to the female screw 15 are provided and lubricating oil from the engine main body 2 is guided to from the first oil passage 12 to the second oil passage 13 along the gap 20 between the thread grooves 15a of the female screw 15 and the thread ridges 14a of the bolt 14, even in a case where the rotating member 19 is fastened to the tip end of the shaft 3, the lubrication passage connected to the scissor gear 1 can be secured in the shaft 3 and thus the lubricating oil can be supplied to the spring chamber 7 of the scissor gear 1. Then, the oil passage can be reduced and a reduction in oil pressure can be suppressed. Working for securing the lubrication passage can be minimized.

In the first oil passage 12, the enlarged diameter portion 12a that is connected to the gap 20 and is also connected to the second oil passage 13 is formed. Thus, even when the position of an outlet 20a of the helical gap 20 relative to an inlet 13a of the second oil passage 13 is shifted in the circumferential direction, the enlarged diameter portion 12a causes the outlet 20a to be reliably connected to the inlet 13a and thus the lubricating oil from the gap 20 can be guided to the second oil passage 13 through the enlarged diameter portion 12a.

In the above-described embodiment, the engine main body 2 is a diesel engine but may be an internal combustion engine such as a gasoline engine.

The present application is based on the Japanese patent application (JP2015-222129) filed on Nov. 12, 2015, the contents of which are incorporated herein by reference.

INDUSTRIAL APPLICABILITY

According to the scissor gear oil supplying structure of this disclosure, it is possible to secure a lubrication passage connected to a scissor gear in a shaft even in a case where a rotating member is fastened to a tip end of the shaft.

REFERENCE SIGNS LIST

1: scissor gear
2: engine main body
3: shaft
3a: front end surface
12: first oil passage
13: second oil passage
14: bolt
14a: thread ridge
15: female screw
15a: thread groove
18: extension hole
19: rotating member
20: gap
C: central axis

The invention claimed is:

1. A scissor gear oil supplying structure comprising:
a scissor gear that is provided on an outer circumference of a tip end portion of a shaft extending from an inside of an engine main body;
a first oil passage that is formed on a central axis of the shaft and extends toward the front in the shaft in an extending direction from the inside of the engine main body;
a second oil passage that is formed and extends from the first oil passage in a radial direction and communicates with the scissor gear;
an extension hole that is formed to extend toward the front from the first oil passage on the shaft and is opened at a front end surface of the shaft;
a female screw that is formed in the first oil passage on a rear side of the second oil passage;
a rotating member that is arranged on the shaft on a front side of the scissor gear; and
a bolt that is inserted into the extension hole and the first oil passage to fasten the rotating member to the shaft and is screwed into the female screw, wherein
lubricating oil from the engine main body is guided from the first oil passage to the second oil passage along a gap between thread grooves of the female screw and thread ridges of the bolt.

2. The scissor gear oil supplying structure according to claim 1, wherein
in the first oil passage, an enlarged diameter portion that is connected to the gap and is also connected to the second oil passage is formed.

3. The scissor gear oil supplying structure according to claim 1, wherein
in the rotating member, a bolt hole penetrating along the central axis is formed, and the bolt is inserted into the first oil passage through the bolt hole and the extension hole and is screwed to the female screw.

4. The scissor gear oil supplying structure according to claim 2, wherein
in the rotating member, a bolt hole penetrating along the central axis is formed, and the bolt is inserted into the first oil passage through the bolt hole and the extension hole and is screwed to the female screw.

* * * * *